(12) United States Patent
Hohimer et al.

(10) Patent No.: US 9,424,522 B2
(45) Date of Patent: *Aug. 23, 2016

(54) INFORMATION PROCESSING SYSTEMS, REASONING MODULES, AND REASONING SYSTEM DESIGN METHODS

(71) Applicant: Battelle Memorial Institute, Richland, WA (US)

(72) Inventors: Ryan E. Hohimer, West Richland, WA (US); Frank L. Greitzer, Richland, WA (US); Shawn D. Hampton, Kennewick, WA (US)

(73) Assignee: Battelle Memorial Institute, Richland, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/828,289

(22) Filed: Aug. 17, 2015

(65) Prior Publication Data

US 2015/0356448 A1 Dec. 10, 2015

Related U.S. Application Data

(63) Continuation of application No. 14/195,694, filed on Mar. 3, 2014, now Pat. No. 9,111,216, which is a continuation of application No. 13/051,979, filed on Mar. 18, 2011, now Pat. No. 8,666,922.

(51) Int. Cl.
*G06F 17/00* (2006.01)
*G06N 5/02* (2006.01)
*G06N 5/04* (2006.01)

(52) U.S. Cl.
CPC ............... *G06N 5/046* (2013.01); *G06N 5/02* (2013.01)

(58) Field of Classification Search
USPC .......................................... 706/47
See application file for complete search history.

(56) References Cited

U.S. PATENT DOCUMENTS

| 7,457,785 | B1 | 11/2008 | Greitzer et al. | |
|---|---|---|---|---|
| 7,958,155 | B2 | 6/2011 | Mershon et al. | |
| 8,023,739 | B2* | 9/2011 | Hohimer ............... | G06N 5/02 382/181 |

(Continued)

OTHER PUBLICATIONS

Documents classification by using ontology reasoning and similarity measure Jun Fang; Lei Guo; Yue Niu Fuzzy Systems and Knowledge Discovery (FSKD), 2010 Seventh International Conference on Year: 2010, vol. 4 pp. 1535-1539, DOI: 10.1109/FSKD. 2010.5569338 IEEE Conference Publications.*

(Continued)

*Primary Examiner* — Michael B Holmes
(74) *Attorney, Agent, or Firm* — Wells St. John P.S.

(57) ABSTRACT

Information processing systems, reasoning modules, and reasoning system design methods are described. According to one aspect, an information processing system includes working memory comprising a semantic graph which comprises a plurality of abstractions, wherein the abstractions individually include an individual which is defined according to an ontology and a reasoning system comprising a plurality of reasoning modules which are configured to process different abstractions of the semantic graph, wherein a first of the reasoning modules is configured to process a plurality of abstractions which include individuals of a first classification type of the ontology and a second of the reasoning modules is configured to process a plurality of abstractions which include individuals of a second classification type of the ontology, wherein the first and second classification types are different.

15 Claims, 7 Drawing Sheets

(56) References Cited

U.S. PATENT DOCUMENTS

| | | | | |
|---|---|---|---|---|
| 8,036,876 | B2* | 10/2011 | Sanfilippo | G06F 17/2785 704/10 |
| 8,140,464 | B2* | 3/2012 | Sanfilippo | G06N 7/005 706/46 |
| 8,561,189 | B2* | 10/2013 | Goranson | H04L 63/1416 709/224 |
| 8,655,809 | B2* | 2/2014 | Hohimer | G06N 5/02 704/4 |
| 8,666,922 | B2* | 3/2014 | Hohimer | G06N 5/046 706/47 |
| 9,111,216 | B2* | 8/2015 | Hohimer | G06N 5/046 |
| 9,218,439 | B2* | 12/2015 | Payne | G06F 17/30991 |

OTHER PUBLICATIONS

An OWL DL ontology based on classification of web services into communities Amel Boustil; Ramdane Maamri; Zaidi Sahnoon ISKO-Maghreb: Concepts and Tools for knowledge Management (ISKO-Maghreb), 2014 4th International Symposium Year: 2014 pp. 1-8, DOI: 10.1109/ISKO-Maghreb.2014.7033467 IEEE Conference Publications.*

Overlapped ontology partitioning based on semantic similarity measures Kobra Etminani; Amin Rezaeian Delui; Mahmoud Naghibzadeh Telecommunications (IST), 2010 5th International Symposium on Year: 2010 pp. 1013-1018, DOI: 10.1109/ISTEL.2010.5734169 IEEE Conference Publications.*

A Method of Specifying and Classifying Requirements Change Shalinka Jayatilleke; Richard Lai 2013 22nd Australian Software Engineering Conference Year: 2013 pp. 175-180, DOI: 10.1109/ASWEC.2013.29 IEEE Conference Publications.*

Bishop et al. "A Risk Management Approach to the "Insider Threat"." In Aspects of Insider Threat. PNNL-SA-69376, Pacific Northwest National Laboratory, Richland, WA. (2010), 24 pages.

Bishop et al. "AZALIA: an A to Z Assessment of the Likelihood of Insider Attack." 2009 IEEE International Conference on Technologies for Homeland Security. IEEE, Piscataway, NJ. (2009), 8 pages.

Bishop et al. "Defining the Insider Threat". In Proceedings of the 2008 Cyber Security and Information Infrastructure Research Workshop, Oak Ridge, TN. (2008), 3 pages.

Cowell et al. "Knowledge Encapsulatation Framework for Collaborative Social Modelling". AAAI Spring Symposium on Technosocial Predicitve Analysis. Stanford, CA. (2008) pp. 12-19.

Gregory et al. "User-directed Sentiment Analysis: Visualizing the Affective Content of Documents", Sentiment Analysis Workshop at ACL. Sydney, Australia, (2006), pp. 23-30.

Greitzer et al. "Combating the Insider Cyber Threat." IEEE Security & Privacy 6(1); (2008), pp. 61-64.

Greitzer et al. "Identifying At-Risk Employees: A Behavioral Model for Predicting Potential Insider Threats", Report PNNL-SA-75790 (Sep. 30, 2010), 46 pages.

Greitzer et al. "Towards a Research Agenda for Cyber Friendly Fire". PNNL-18995, Pacific Northwest National Laboratory, Richland, WA. (2009), 32 pages.

Hui et al. "Quantifying Sentiment and Influence in Blogspaces." In SOMA 2010—Workshop on Social Media Analytics Held in conjunction with The 16th ACM SIGKDD International Conference on Knowledge Discovery and Data Mining (2010), 9 pages.

Zhang et al. "Graph Based Strategies to Role Engineering". In Proceedings of the 6th Cyber Security and Information Intelligence Research Workshop (CSIIRW'10), Oak Ridge, Tennessee, USA (Apr. 2010), 4 pages.

Zhang et al. "Permission Set Mining: Discovering Practical and Useful Roles". In Proceedings of the twenty-fourth Annual Computer Security Applications Conference (ACSAC 24), Anaheim, California, USA (Dec. 2008), pp. 247-256.

* cited by examiner

INFORMATION PROCESSING SYSTEMS, REASONING MODULES, AND REASONING SYSTEM DESIGN METHODS

RELATED PATENT DATA

This patent is a continuation of and claims priority to U.S. patent application Ser. No. 14/195,694 filed Mar. 3, 2014, titled "Information Processing Systems, Reasoning Modules, and Reasoning System Design Methods", which is a continuation of and claims priority to U.S. patent application Ser. No. 13/051,979 filed Mar. 18, 2011, titled "Information Processing Systems, Reasoning Modules, And Reasoning System Design Methods", the disclosures of which are incorporated herein by reference.

STATEMENT AS TO RIGHTS TO INVENTIONS MADE UNDER FEDERALLY-SPONSORED RESEARCH AND DEVELOPMENT

This invention was made with Government support under Contract DE-AC0576RLO1830 awarded by the U.S. Department of Energy. The Government has certain rights in the invention.

TECHNICAL FIELD

This disclosure relates to information processing systems, reasoning modules, and reasoning system design methods.

BACKGROUND OF THE DISCLOSURE

Reasoning systems are utilized to process information, such as classifying pieces of information in a data set. Reasoning systems may process different topics of information. Semantic reasoning systems may generate and utilize semantic graphs which include links and nodes where a plurality of nodes may be associated with one another by one or more links. The links may indicate relations between different nodes and properties.

At least some aspects of the disclosure are directed towards methods and apparatuses which process information including methods and apparatus which reason over information using semantic graphs in some implementations.

BRIEF DESCRIPTION OF THE DRAWINGS

Exemplary embodiments of the disclosure are described below with reference to the following accompanying drawings.

DETAILED DESCRIPTION OF THE DISCLOSURE

According to one embodiment, an information processing system comprises working memory comprising a semantic graph which comprises a plurality of abstractions, wherein the abstractions individually include an individual which is defined according to an ontology and a reasoning system comprising a plurality of reasoning modules which are configured to process different abstractions of the semantic graph, wherein a first of the reasoning modules is configured to process a plurality of abstractions which include individuals of a first classification type of the ontology and a second of the reasoning modules is configured to process a plurality of abstractions which include individuals of a second classification type of the ontology, wherein the first and second classification types are different.

According to an additional embodiment, a reasoning module comprises an interface coupled with a working memory and configured to receive a plurality of abstractions from the working memory, wherein the abstractions include a plurality of individuals and a reasoning component configured to access the abstractions which are received by the interface, to access a plurality of rules for the reasoning module, to process the abstractions according to the rules, and to further classify the individual of one of the abstractions as a result of the processing of the one of the abstractions satisfying the rules of the reasoning module.

According to another embodiment, a reasoning system design method comprises providing a domain ontology of a given subject matter domain to be processed and using the domain ontology, designing a reasoning system which is configured to process information of the given subject matter domain including defining, for a plurality of reasoning modules of the reasoning system, which abstractions of a semantic graph are to be subscribed to by respective ones of the reasoning modules and the rules which the reasoning modules are to utilize to process respective ones of the abstractions which are subscribed to by respective ones of the reasoning modules.

Figure 1:
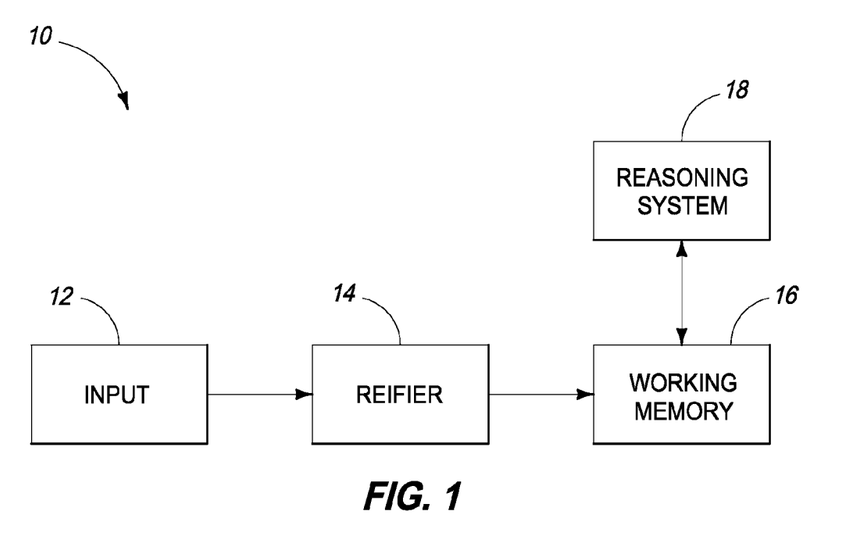
FIG. 1 is a functional block diagram of an information processing system according to one embodiment.

Referring to FIG. 1, one embodiment of an information processing system 10 is shown. The example information processing system 10 includes an input 12, a reifier 14, a working memory 16 and a reasoning system 18. Other embodiments are possible. For example, in one other example embodiment, a plurality of reifiers 14 may be coupled with a plurality of inputs 12 and the working memory 16.

Input 12 may be coupled with one or more source of digital data which may be reasoned over by information processing system 10. For example, one of the sources may include data of one of a plurality of different possible subject matter domains which is to be processed by the information processing system 10. In the example embodiment described herein, the information processing system 10 is configured to process the received data and infer new knowledge from existing knowledge. For example, the information processing system 10 may further classify abstractions in the form of semantic graphs in one embodiment using subsumption and/or composite processing as discussed in additional detail below.

In one specific example implementation described herein for illustrative purposes, information processing system 10 is configured to process information in an attempt to detect an insider threat in cyberspace. Such a system 10 may be configured to receive data from a plurality of different domains (e.g., computer events of employees, human resource inputs, social media inputs, etc.). Accordingly, in this described configuration, a plurality of inputs 12 and respective reifiers 14 may be provided to correspond to respective different ones of the knowledge domains and may be configured to process data of the respective different subject matter or knowledge domains (e.g., one reifier for processing computer events of employees, another reifier for processing human resource inputs, another reifier for processing social media inputs, etc.). This example described herein with respect to insider threat detection is provided to illustrate example embodiments of the disclosure and the information processing system 10 may be programmed to reason over information of other subject matter domains for other applications in other embodiments.

An individual reifier 14 is configured to access raw data from one or more external source and package the information into appropriate formats for processing within the information processing system 10. The information processing system 10 is configured to process the received data using object-oriented programming in one implementation, and reifier 14 is configured to instantiate data from the input 12 and package the data into a plurality of individuals in the form of ontology web language (OWL) representations of the data in the described implementation. The individuals may be instantiated in java objects called abstractions in one embodiment which are added to working memory 16. Accordingly, in one embodiment, the reifier 14 asserts OWL individuals into working memory 16 via abstractions as defined by a respective domain ontology for the reifier 14 as described further below. More specifically, different reifiers 14 may be programmed to process data of different subject matter domains as defined by applicable domain ontologies for the reifiers 14 as discussed further below in one implementation.

Referring to the insider threat example mentioned above, a reifier 14 may be configured to sense information from an event log from a computer system. The responsibility of the reifier 14 is to parse the event logs and instantiate OWL individuals and put them into working memory 16 in one embodiment. For example, the reifier 14 may assert low level individuals (primitives) into working memory 16.

An individual reifier 14 forms the individuals which are defined by a respective domain ontology corresponding to the subject matter domain of information to be processed by the reifier 14 in one embodiment. For example, computer code for a specific reifier 14 may be programmed by an expert in the respective domain and which converts raw data into individuals of a data-type which is defined in the domain ontology which applies to the reifier 14. As mentioned above, a plurality of reifiers 14 may be provided to process information, and the reifiers 14 may be programmed using a common domain ontology or different domain ontologies. Accordingly, the reifiers 14 may be configured to receive data from the same or different sources and to instantiate individuals of different classification types into working memory 16 as defined by the respective domain ontologies for the reifiers 14 in at least one implementation.

Referring again to the above-mentioned insider threat example, a reifier 14 is programmed to parse one entry out of an event log (e.g., generated by a computer system of an employee of an organization) and instantiate an individual of a single event class which is defined in the domain ontology. In one more specific example, the following log entry is generated by Windows Server 2000, Windows XP, and Windows Server 2003 when a logon failure occurs:

Logon Failure 529
Reason: Unknown user name or bad password
User Name: john_doe
Domain: acamp.pnl.gov
Logon Type: 7
Logon Process:
Authentication Package:
Workstation Name: minsky
Date: 01/30/2010
Time: 13:27:34

A reifier 14 which is programmed to process information in a security domain may convert lines of the entry in the log into an individual of the appropriate type from the respective domain ontology. The individual is inserted into working memory 16 for further classification by reasoning system 18 in one embodiment. For example, reifier 14 may be configured to instantiate individuals of type SecurityEvent corresponding to failed login events of a user and which may be further processed using the reasoning system 18. For example, as discussed below, a reasoning module of the reasoning system 18 may access these individuals, determine their states by reviewing whether their event IDs have a value of 529, and if so, assert a new data type property for each of the appropriate individuals as a FailedLogin.

Working memory 16 is a machine readable knowledgebase (KB) in the described example embodiment and may also be referred to as a RDF triple store. In one embodiment, the knowledgebase is constructed with OWL and is a collection of individuals which are instantiations of class types defined in one or more domain ontology by reifiers 14 and reasoning modules described below.

The collection of individuals within working memory 16 take the form of a semantic graph in one example which is a set of nodes (individuals, data, etc.) and associated relationships (properties) between them represented by edges. The edges may be object-properties which connect individuals to other individuals or data-properties which connect individuals to data, such as integers, strings, Booleans, etc. The semantic graph stored in the working memory 16 grows over time as data is processed (e.g., further classified) as discussed below.

In one embodiment, reasoning system 18 is implemented as an inference engine which accomplishes deductive reasoning of new knowledge which is inferable from current knowledge. More specifically, reasoning system 18 accesses and processes the individuals from working memory 16 in one embodiment. The reasoning system 18 may further classify the individuals as a result of subsumption and/or composite processing in illustrative embodiments.

As is discussed in further detail below, reasoning system 18 includes a plurality of reasoning modules which are configured to process the abstractions including individuals and which are stored in working memory 16 in one embodiment. Examples of processing of abstractions are discussed below with respect to FIGS. 7A-7B and 8A-8B.

An example reasoning module is discussed below with respect to FIG. 3. The reasoning modules are configured to access individuals from the working memory 16 and may include individuals instantiated by the reifiers 14 or published to working memory 16 by other reasoning modules. An individual reasoning module may further classify existing individuals or create new individuals (objects) of a different classification type (e.g., having a new object property). Reasoning system 18 may include different types of reasoning modules including subsumption and composite reasoning modules.

Furthermore, the reasoning modules may be arranged in a hierarchy as defined by a respective domain. Some implementations of the reasoning system 18 provide a plurality reasoning modules arranged at a plurality of different hierarchical levels. In some embodiments, for example discussed below with respect to FIG. 5, the reasoning system 18 also may include a plurality of different regions of reasoning modules which correspond to different subject matter domains and which subscribe to and/or publish individuals of the respective domain with respect to the working memory 16. The semantic graph of the working memory 16 grows as a result of the processing by the reasoning modules of the reasoning system 18 including creation of new individuals and/or further classification of existing individuals as discussed below.

Figure 2:
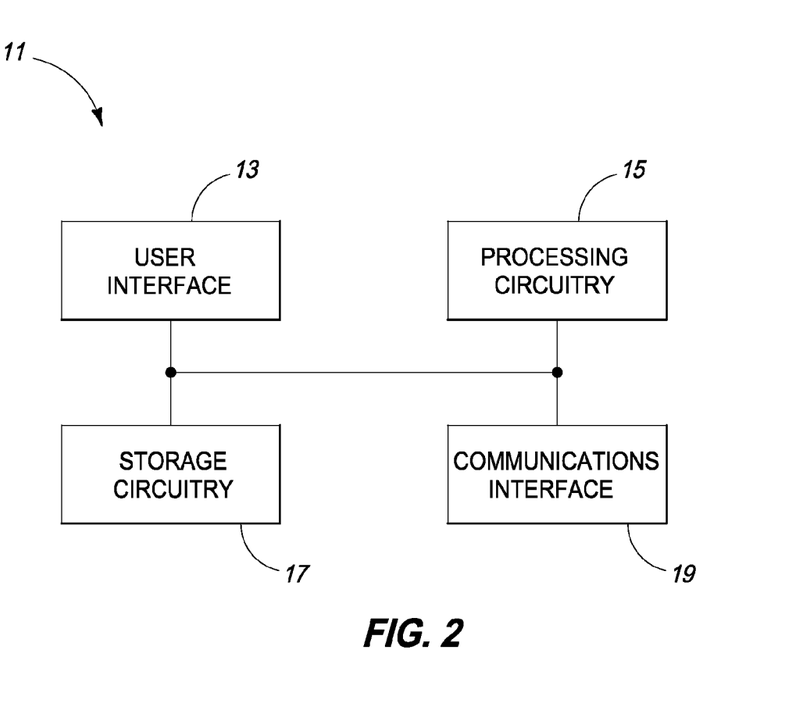
FIG. 2 is a functional block diagram of a computing system according to one embodiment.

Referring to FIG. 2, one example embodiment of hardware in the form of a computing system 11 which may be utilized to implement the information processing system 10 is shown. In the illustrated embodiment, computing system 11 includes a user interface 13, processing circuitry 15, storage circuitry 17 and a communications interface 19. Other embodiments are possible including more, less and/or alternative components.

User interface 13 is configured to interact with a user including conveying data to a user (e.g., displaying visual images for observation by the user) as well as receiving inputs from the user. User interface 13 is configured as graphical user interface (GUI) in one embodiment. User interface 13 may be configured differently in other embodiments. For example, a user may interact with user interface 13 to interact with the information processing system 10 in one embodiment. A user may display representations of information and knowledge created by the information processing system 10 and submit inputs to interact with the information processing system 10. For example, a user may utilize an editor, such as protégé available from Stanford University, to interact with the information processing system 10 including, for example, submitting search strings to search results processed by the information processing system 10. Furthermore, a user may program the information processing system using the user interface 13, for example, by programming the system 10, such as specifying the rules of one or more reasoning module in but one example.

In one embodiment, processing circuitry 15 is arranged to process data, control data access and storage, issue commands, and control other desired operations. Processing circuitry 15 may implement the operations of the reifier(s) 14, working memory 16 and reasoning system 18 (e.g., reasoning modules 20) in one embodiment. For example, the processing circuitry 15 may implement reifying operations, the subscription to and publishing of abstractions between reasoning modules and the working memory 16, implement the rules of the respective reasoning modules during processing of abstractions, and implement other operations to implement the processing of data.

Processing circuitry 15 may comprise circuitry configured to implement desired programming provided by appropriate computer-readable storage media in at least one embodiment. For example, the processing circuitry 15 may be implemented as one or more processor(s) and/or other structure configured to execute executable instructions including, for example, software and/or firmware instructions. Other exemplary embodiments of processing circuitry 15 include hardware logic, PGA, FPGA, ASIC, state machines, and/or other structures alone or in combination with one or more processor(s). These examples of processing circuitry 15 are for illustration and other configurations are possible.

Storage circuitry 17 is configured to store programming such as executable code or instructions (e.g., software and/or firmware), electronic data, databases, data structures, or other digital information and may include computer-readable storage media. At least some embodiments or aspects described herein may be implemented using programming stored within one or more computer-readable storage medium of storage circuitry 17 and configured to control appropriate processing circuitry 15.

The computer-readable storage medium may be embodied in one or more articles of manufacture which can contain, store, or maintain programming, data and/or digital information for use by or in connection with an instruction execution system including processing circuitry 15 in the exemplary embodiment. For example, exemplary computer-readable storage media may be non-transitory and include any one of physical media such as electronic, magnetic, optical, electromagnetic, infrared or semiconductor media. Some more specific examples of computer-readable storage media include, but are not limited to, a portable magnetic computer diskette, such as a floppy diskette, a zip disk, a hard drive, random access memory, read only memory, flash memory, cache memory, and/or other configurations capable of storing programming, data, or other digital information.

Communications interface 19 is arranged to implement communications of computing system 11 with respect to external devices (not shown). For example, communications interface 19 may be arranged to communicate information bi-directionally with respect to computing system 11. Communications interface 18 may be implemented as a network interface card (NIC), serial or parallel connection, USB port, Firewire interface, flash memory interface, or any other suitable arrangement for implementing communications with respect to computing system 11. In one embodiment, communications interface 19 may include one or more of the inputs 12 of FIG. 1 which receive information to be processed by the information processing system 10. Communications interface 19 may also output information externally of the computing system 11, such as the results of the processing, to external devices.

Figure 3:
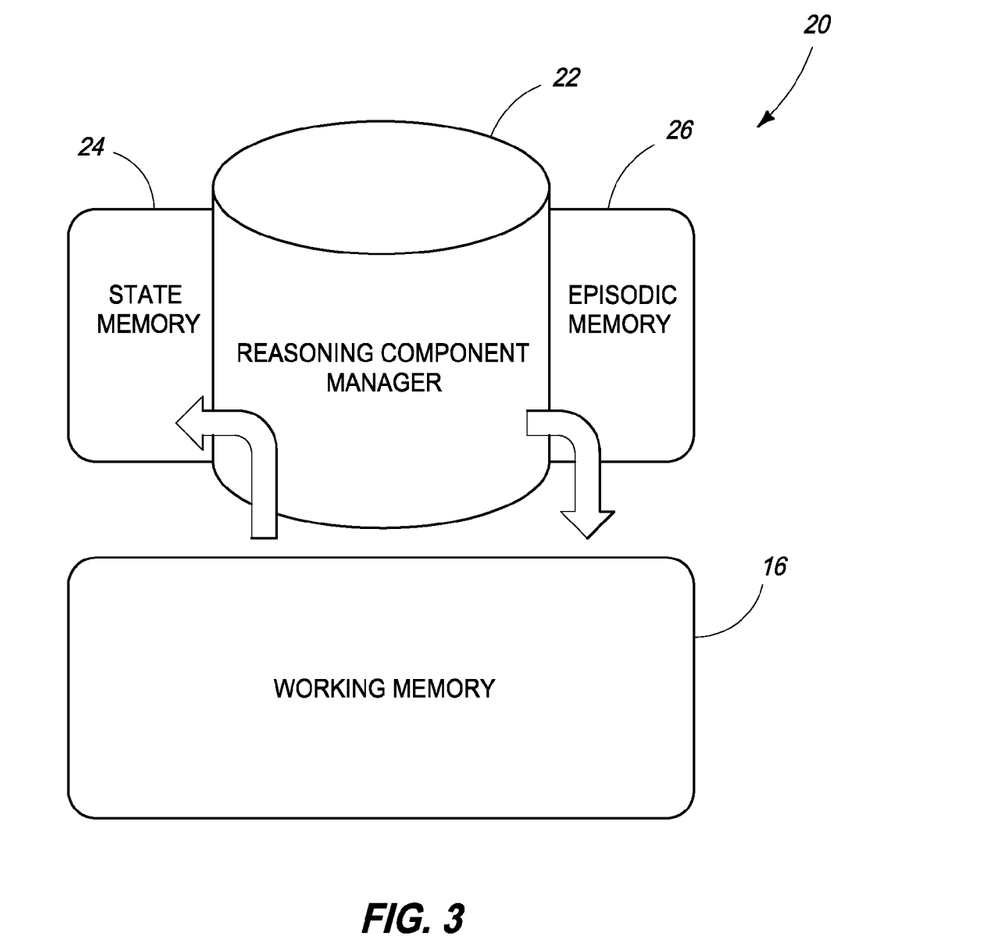
FIG. 3 is a functional block diagram of a reasoning module according to one embodiment.

Referring to FIG. 3, an example of one of the reasoning modules 20 of the reasoning system is shown according to one embodiment. The illustrated embodiment of the reasoning module 20 of FIG. 3 includes a reasoning component manager 22, a state memory 24, and an episodic memory 26. Other configurations of reasoning module 20 are possible. In the example of FIG. 3, memory refers to a machine readable Knowledge Base (KB) which stores knowledge in a form that can be processed by an inference-engine to accomplish deductive reasoning about new knowledge inferable from current knowledge. Knowledgebases constructed with OWL are a collection of individuals, or instantiations of the class types, defined in the respective domain ontology, which take the form of a semantic graph including nodes and edges relating the nodes. Accordingly, in FIG. 3, memory may also refer to semantic graphs of abstractions including individuals in OWL format according to one embodiment.

The reasoning system may include a plurality of reasoning modules 20 which may be arranged in an hierarchy and/or in a plurality of regions as previously mentioned and discussed further below. An individual reasoning module 20 is arranged to process abstractions in accordance with rules defined for the respective reasoning module 20 in accordance with an applicable domain ontology for the module 20. Different domain ontologies may be provided for different regions of reasoning modules 20 in some embodiments (and the reasoning modules 20 of the different regions may be configured differently according to different rules established by the different domain ontologies) and some of the reasoning modules 20 may process abstractions at different hierarchical levels of abstraction as defined by the applicable hierarchy of a respective domain ontology.

An individual reasoning module 20 subscribes to abstractions of a type defined by the domain ontology for the reasoning module 20. When a new abstraction and individual are added to working memory 16, the working memory 16 passes the new abstraction and individual to reasoning module(s) 20 that have subscribed to the abstraction type added in accordance with the respective domain ontology. Accordingly, in one embodiment, individual reasoning modules 20 are constrained to reason over subsets or portions of the semantic graph of the working memory 16 as defined by the rules for the individual reasoning modules 20 in the domain ontology. A specific reasoning module 20 may only subscribe to and reason over abstractions including individuals of a given classification type as defined by the domain ontology while ignoring abstractions which include individuals of other classification types of the domain ontology in one embodiment.

In the described insider threat example, a reifier 14 adds "SecurityEvent" abstractions to the working memory 16 based upon received raw data, and these abstractions are provided to one or more reasoning modules 20 which subscribe to "SecurityEvent" abstractions. The respective reasoning module(s) 20 attempt to further classify the received abstractions in one embodiment, for example defining a "SecurityEvent" abstraction and individual as a failed login or multiple failed login as discussed below.

The domain ontologies provide the data type definitions for the information processing system 10. The lowest level data types are frequently the primitive literals representing the most basic of typed data. Reifiers 14 are responsible for instantiating individuals of these primitive types and adding them to the working memory 16. The low level literals provided by reifiers 14 are defined by the class called "SecurityEvent" and this class definition is in the domain ontology in the described insider threat example.

For an individual reasoning module 20, a Formal Knowledge Representation and Reasoning (KR&R) language and constructs are used to provide rules (e.g., Semantic Web Rule Language (SWRL) rules) and the problem to be addressed in one embodiment. The rules are specified according to the domain ontology for the respective reasoning module 20. If an abstraction being processed satisfies the rules for the respective reasoning module 20, then the individual may be further classified by the reasoning module 20 (e.g., the reasoning module 20 may add a new typing property or create a new individual of a new class).

In one embodiment, an abstraction is received by a reasoning module 20 from the working memory as a result of the abstraction being of the type subscribed to by the reasoning module 20 as defined by the domain ontology. As discussed further below, the reasoning modules 20 may be configured to according to respective ontologies to implement composite or subsumption processing in illustrative examples. The reasoning module 20 includes a reasoning component manager 22 which adds the abstraction to its local knowledgebase by creating a reasoning component including the received abstraction and a reasoner, such as a Pellet reasoner in one example. The reasoner loads a respective ontology which is utilized to process the received abstraction. The ontology specific for an individual reasoning component has class definitions and rules which are particular to the scope of the reasoning module 20. The processing of the abstraction using the reasoning component occurs in the state memory 24 in one embodiment.

If the reasoner is able to infer a new abstraction (i.e., the rules are met by the abstraction), the reasoning module 20 publishes the new abstraction (e.g., the abstraction with a new property added) back into the working memory 16. Furthermore, the reasoning module 20 may also publish the new abstraction into episodic memory 26. The working memory 16 thereafter passes the new abstraction to other reasoning modules 20 which subscribe to the abstraction type added as determined by the domain ontology in one embodiment.

Referring again to the insider threat example, a reasoner of the reasoning component of a reasoning module 20 responsible for recognizing "FailedLogin" abstractions loads a FailedLoginRules ontology specific for the respective reasoning module 20 upon receipt of an abstraction. The ontology for this example reasoning module 20 provides the needed rules and definitions for the reasoner of the reasoning component to infer that the abstraction should or should not be asserted as a FailedLogin abstraction. In the above-described example, the reasoning component 22 implementing the respective rules determines whether the abstraction includes a 529 log entry, and if so, asserts a new data property of the abstraction as a FailedLogin. The new abstraction can be published to working memory 16 and also stored in episodic memory 26 and thereafter passed to other reasoning modules 20 which subscribe to FailedLogin abstractions.

This example methodology offers two opportunities for the reasoning system 10 to "learn." First, an operator of the information processing system 10 can provide feedback in the form of edits to the SWRL rule expressions that the reasoning modules use to recognize abstractions. This is a direct editing of the description logics used to define the abstractions. Second, once a sufficient number of abstractions have been added to the episodic memory of a reasoning module, statistical analysis of the library of abstractions can lead to SWRL rule modifications that can better classify future abstractions.

As discussed above, the processing operations of the information processing system 10 may be defined by one or more domain ontologies. For example, the domain ontology may control operations of respective reifiers, interaction of the processing operations of the reasoning modules 20 with respect to one another, different hierarchical arrangements of reasoning modules 20, define which types of abstractions are subscribed to by respective reasoning modules 20, and the rules which are applied by individual ones of the reasoning modules 20 to process the abstractions according to one embodiment.

Furthermore, different domain ontologies may be utilized to control the operations of different reifiers 14 and the operations and arrangements of different reasoning modules 20 according to one embodiment. The reasoning system 18 may be implemented in a plurality of different regions which have different governing domain ontologies in one embodiment described in further detail below with respect to FIG. 6.

In one embodiment, OWL is used as the knowledge representation language and implements the ontologies and knowledgebases of the system. Individual knowledgebases are governed by a plurality of ontologies including a domain ontology, core ontology, and bridge ontology in the described embodiment. The domain ontology represents the subject matter expert (SME) knowledge, the core ontology represents architecture specific knowledge (framework of the reasoning modules, such as inputs and outputs of the reasoning modules) and the bridge ontology relates the subject matter expert knowledge with the core knowledge. In one embodiment, the governing domain ontologies define the data types of the system and provide the same type definitions for the reifiers, memory stores and reasoning engines.

In one embodiment, an expert in a given subject matter area may define the domain ontology which, for example, determines the number of reifiers 14 to be implemented to process data within the respective domain, the number of reasoning modules 20 to be implemented to process data within the respective domain, the rules applied by the reasoning modules 20 to the data, and the interactions of the reasoning modules 20 with respect to one another and working memory 16 to perform the desired processing operations of data (e.g., the domain ontology may define the hierarchy of the reasoning modules 20 as well as specify the classes of abstractions which are subscribed to by respective ones of the reasoning modules 20). Different experts may be used to define the domain ontologies for different domains of knowledge to be reasoned over by the information processing system 10.

Following the creation of the one or more domain ontologies, the bridge ontology discussed above specifies how the reifiers 14 and reasoning modules 20 for the specific domain ontology are implemented and constructed to process data with respect to one another using the core ontology. For example, the core ontology may specify the inputs and outputs of individual ones of the reifiers 14 and reasoning modules 20 and the bridge ontology dictates how the reifiers 14 and reasoning modules 20 are implemented within a specific system (e.g., which reasoning modules 20 process outputs from other reasoning modules 20 or reifiers 14 and the rules they apply) which is programmed to reason over a respective subject matter domain as defined by the domain ontology in one embodiment.

In one embodiment, the reasoning modules are domain agnostic while the domain and bridge ontologies specify how the reasoning modules are to be arranged to perform processing according to a respective domain ontology. Domain knowledge and reasoning framework are separated in one embodiment of the information processing system 10 which enables modifications or improvements to the domain knowledge without editing and recompiling source code. In one embodiment, the domain knowledge is encoded in a formalized knowledge representation language, and the reasoning framework is encoded in an object oriented programming language. Once the domain ontology has been specified by appropriate personnel, the bridge and core ontologies determine how the reasoning system and reasoning modules therein are configured and arranged to process the abstractions of data provided by the reifiers. As discussed herein, a plurality of domain ontologies can be specified and used to reason over data of different subject matter domains and the results of the processing according to the individual domain ontologies may be combined to further process and classify the data using another domain ontology.

Figure 4:
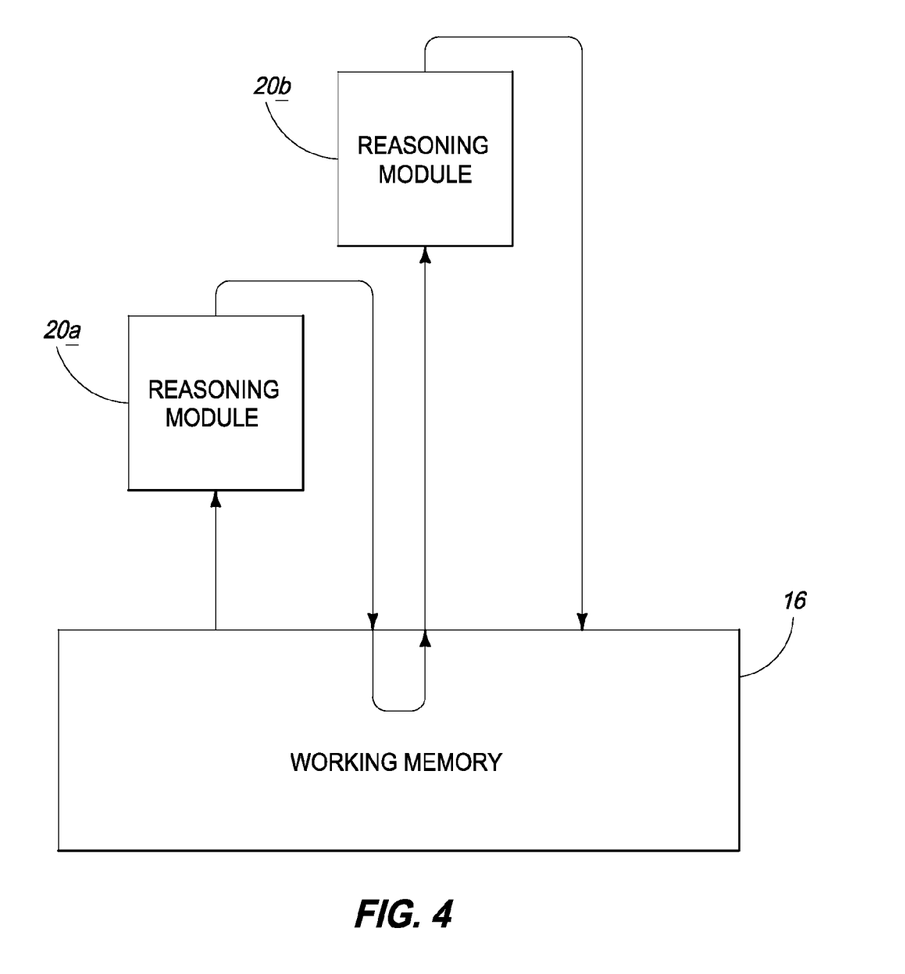
FIG. 4 is a functional block diagram of a plurality of reasoning modules and working memory according to one embodiment.

Referring to FIG. 4, example process cycles of plural reasoning modules 20a, 20b are shown according to one embodiment. The reasoning modules 20a, 20b shown in FIG. 4 are arranged in a hierarchical implementation according to the respective domain and bridge ontologies and include a first (low) level reasoning module 20a and a second (higher) level reasoning module 20b. The domain ontology specifies the rules for the reasoning modules to process information for a specific domain while the bridge ontology specifies the hierarchical arrangement of the reasoning modules 20, using the core ontology, within the reasoning system 18 to accomplish the processing for the respective domain. In the illustrated example, reasoning module 20a subscribes to low level primitive abstractions of individuals, for example, provided by the reifiers 14 or another reasoning module (not shown), and reasoning module 20b subscribes to higher level abstractions in working memory 16.

In the illustrated example, the reasoning module 20a has an interface which receives low level abstractions from the working memory 16 corresponding to the types of abstractions subscribed to by module 20a. The reasoning module 20a processes (e.g., reasons over) the received abstraction. In the described embodiment, the reasoning module 20a evaluates the SWRL rules applicable for the respective reasoning module 20a for the abstraction. The SWRL rules may assert additional typing data-properties if appropriate. In the illustrated example, the SWRL rules were met, a new data-property is typed and the new abstraction is republished to working memory 16 by reasoning module 20a. The new abstraction may also be retained in episodic memory of the reasoning module 20a as well as being published to the working memory 16 in one embodiment.

Upon receipt of the new abstraction from reasoning module 20a, the working memory 16 passes the new abstraction to reasoning modules which subscribe to the type of new abstraction published by reasoning module 20a. In the illustrated embodiment, working memory 16 passes the new abstraction to the higher level reasoning module 20b. Reasoning module 20b reasons over the received abstraction using its respective SWRL rules. In the illustrated embodiment, the SWRL rules were satisfied for the reasoning module 20b and the reasoning module 20b created a new data type for the abstraction containing the individual and republishes the new abstraction back to working memory 16. Working memory 16 may thereafter pass the new abstraction to other reasoning modules (not shown) which subscribe to the new type of abstraction published by reasoning module 20b. Accordingly, in one embodiment, one or more of the reasoning modules is configured to process abstractions as a result of processing of the abstractions by others of the reasoning modules.

Figure 5:
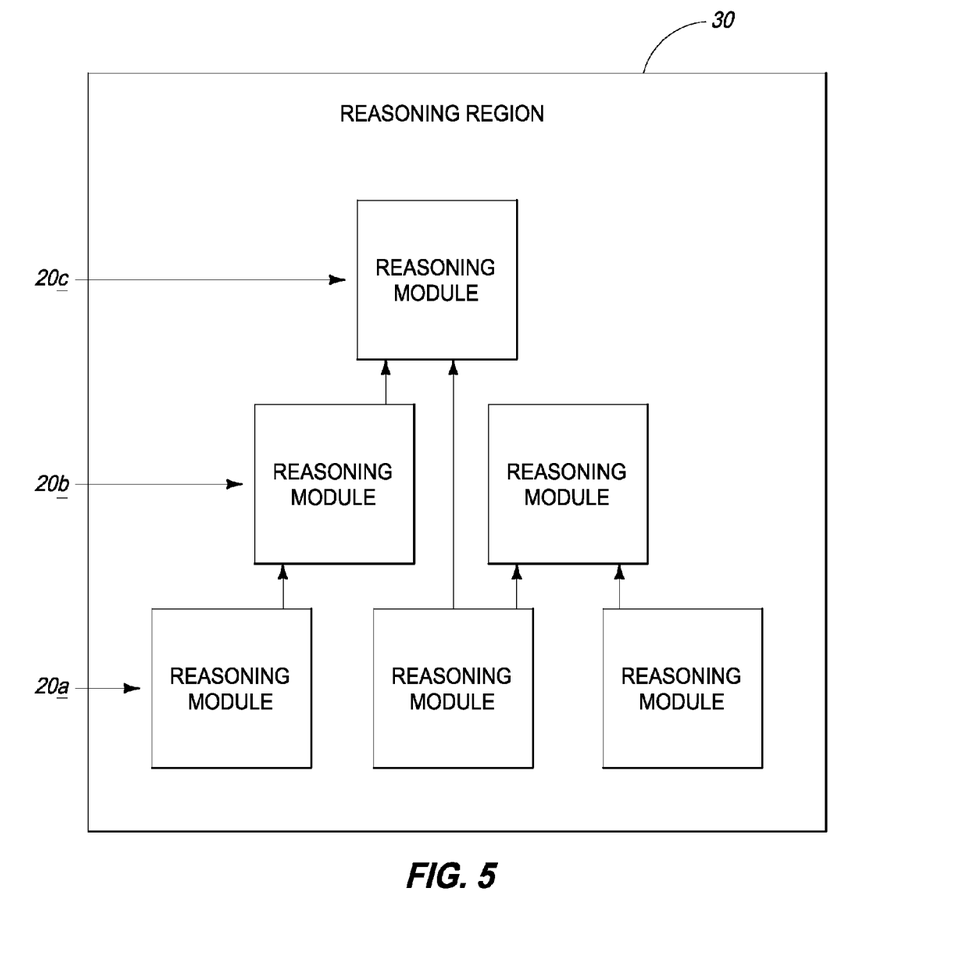
FIG. 5 is a functional block diagram of a reasoning region according to one embodiment.

Referring to FIG. 5, another example arrangement of a plurality of hierarchical levels of reasoning modules 20a, 20b, 20c are shown as determined by the domain and bridge ontologies for a reasoning region 30 (e.g., corresponding to a respective domain). The illustrated example includes three hierarchical levels of reasoning modules 20a, 20b, 20c within a reasoning region 30. The working memory 16 is not shown in FIG. 5 although the abstractions flow through the working memory 16 between different reasoning modules as discussed above in one embodiment (e.g., the reasoning modules 20a, 20b, 20c receive abstractions from working memory 16 and publish abstractions to working memory 16 without direct communication of abstractions between reasoning modules in one arrangement).

As illustrated, some of the reasoning modules receive abstractions from only one reasoning module (i.e., the left reasoning module 20b) while other reasoning modules receive abstractions from a plurality of different reasoning modules (i.e., the right reasoning module 20b). Furthermore, some reasoning modules may receive abstractions from reasoning modules at a plurality of different hierarchical levels (i.e., reasoning module 20*c*).

In the illustrated arrangement of FIG. 5, the reasoning modules 20*a*, 20*b*, 20*c* belong to a single subject matter domain or region 30. However, other arrangements of reasoning system 18 may be configured to reason over data from a plurality of different subject matter domains.

Figure 6:
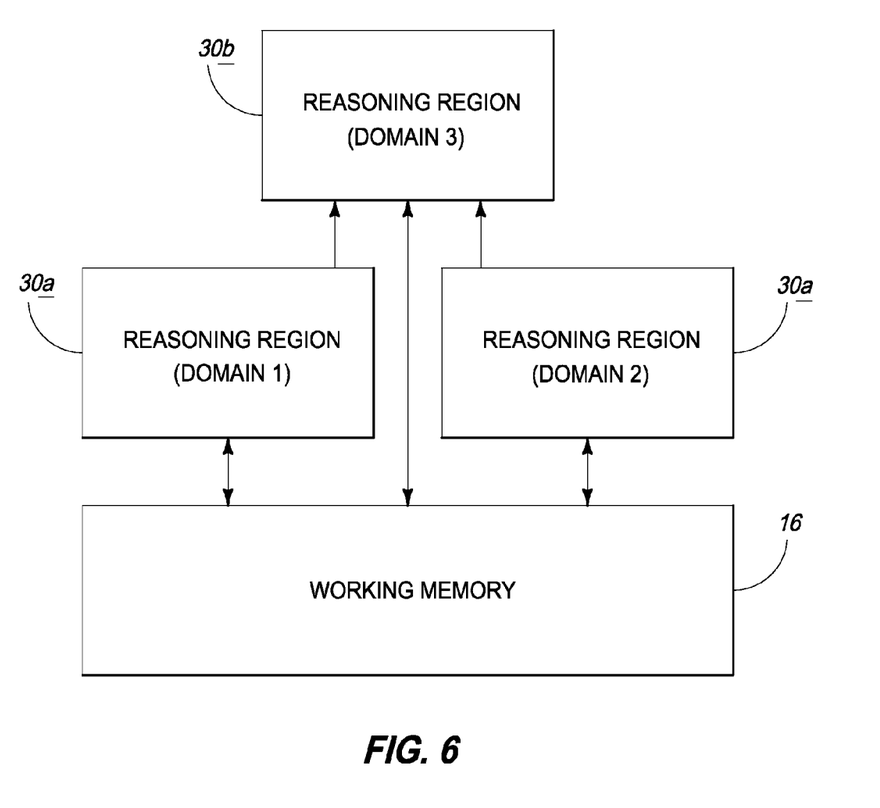
FIG. 6 is a functional block diagram of a plurality of reasoning regions according to one embodiment.

For example, the illustrated example of FIG. 6 includes a plurality of reasoning regions 30*a*, 30*b* at different hierarchical levels with reasoning regions 30*a* being lower than region 30*b*. The respective reasoning regions 30*a*, 30*b* may be arranged to reason over different subject matter domains and the reasoning regions 30*a*, 30*b* may be configured differently according to different domain and bridge ontologies corresponding to the subject matter areas to be processed within the respective regions 30*a*, 30*b*. The different domain ontologies for the reasoning regions 30*a*, 30*b* may be based upon expert knowledge for the different subject matter domains.

Individual ones of the reasoning regions 30*a*, 30*b* may include a plurality of reasoning modules 20 (not shown in FIG. 6) which are configured to reason over information which corresponds to the particular subject matter domain of the respective reasoning region 30*a*, 30*b*. The reasoning modules of the different reasoning regions 30*a*, 30*b* receive and publish abstractions with respect to working memory 16 in one embodiment. The reasoning modules within the different reasoning regions 30*a*, 30*b* may be configured differently according to the different domain ontologies for the respective regions. For example, the different domain ontologies may specify which reasoning modules of the respective regions 30*a*, 30*b* subscribe to which types of abstractions as well as the rules which are applied by the reasoning modules during the processing of the abstractions in accordance with the domain ontologies.

Referring again to the insider threat example, one of the reasoning regions 30*a* corresponding to "domain 1" may be configured to reason over information pertaining to security events generated by employees interacting with a computer of an organization (e.g., failed login attempts, logging in at abnormal hours, downloading large amounts of data). Another of the reasoning regions 30*a* corresponding to "domain 2" may be configured to reason over information of another domain, for example, human resources reports generated by the employer organization of the employees (e.g., reports regarding employees behavior of quarreling with co-workers, anger issues, feeling under-appreciated, etc.).

As mentioned above, the reasoning regions 30*a*, 30*b* may be arranged at a plurality of hierarchical levels. Although only two levels are shown in FIG. 6, other embodiments of reasoning system 18 may include additional levels. Reasoning modules of the lower level reasoning regions 30*a* subscribe to and publish abstractions with new classification information with respect to working memory 16 in one embodiment. Reasoning modules (not shown) of the higher level reasoning region 30*b* subscribe to abstractions from the lower reasoning regions 30*a* and publish the abstractions having additional classification information to working memory 16 in the illustrated embodiment. In the depicted example, the higher level reasoning region 30*b* reasons over abstractions of both domains and may generate new abstractions which are published to the working memory 16 as a result of the reasoning. Accordingly, in one embodiment, an abstraction including an individual may be further classified as the abstraction is processed by reasoning modules at different levels of the hierarchy (e.g., a lower level reasoning module may add one data type property to an abstraction and a higher level reasoning module may add another data type property to the same abstraction).

Referring again to the insider threat example, the reasoning region 30*b* may include a reasoning module which creates a new abstraction which may identify a specific employee as being of interest as a result of abstractions from the left reasoning region 30*a* indicating that the employee's computer was accessed during periods of time other than normal business hours and a large amount of data was downloaded and as a result of abstractions from the right reasoning region 30*a* indicating the employee has had one or more negative report from the human resources department.

The subject matter domains of information processed by the respective reasoning regions discussed above are clearly for illustrative purposes and the reasoning regions may be configured to reason over other desired subject matter domains in other implementations, such as organisms, financial markets, sports, medicine, news, etc. or any other subject matter area of interest.

Furthermore, these examples illustrate the highly flexible arrangement of the information processing system 10 which may be configured in different arrangements to process data of one or more different subject matter domains. Once the domain ontologies have been written, the information processing system 10 in the described example may be designed and configured to reason over the data for the domains using the bridge and core ontologies.

As described above, reasoning modules of the reasoning system may be configured to perform subsumption processing of abstractions or composite processing of abstractions. One example of subsumption reasoning is discussed below with respect to the semantic graphs of FIGS. 7A and 7B and one example of composite reasoning is discussed below with respect to the semantic graphs of FIGS. 8A and 8B. The semantic graphs of the abstractions of FIGS. 7A, 7B, 8A and 8B are examples of sub-graphs of the larger semantic graph of the working memory and the illustrated sub-graphs may be subscribed to by respective ones of the reasoning modules and published back to the larger semantic graph of the working memory after processing by the respective reasoning modules. These examples of FIGS. 7A, 7B, 8A and 8B are discussed in line with the insider threat example discussed previously.

Figure 7A:
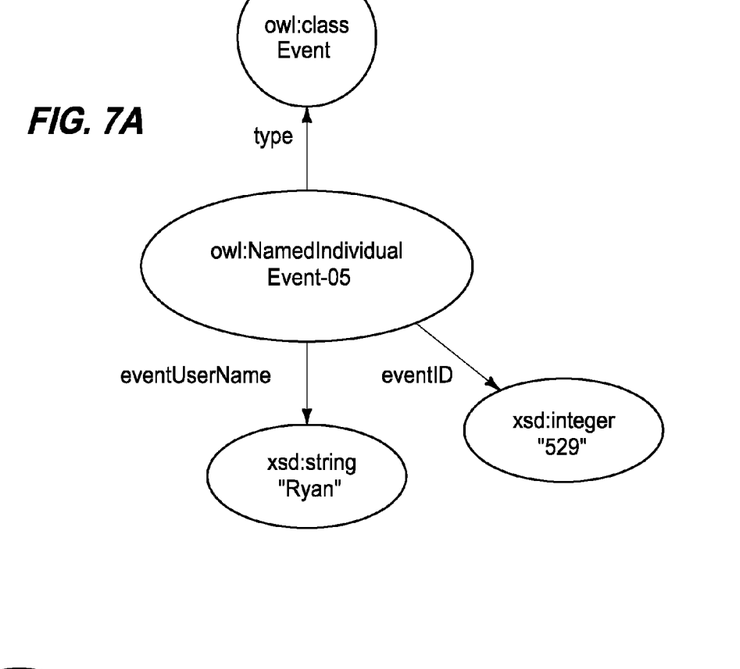
FIGS. 7a and 7b are semantic graphs depicting subsumption processing according to one embodiment.
Figure 7B:
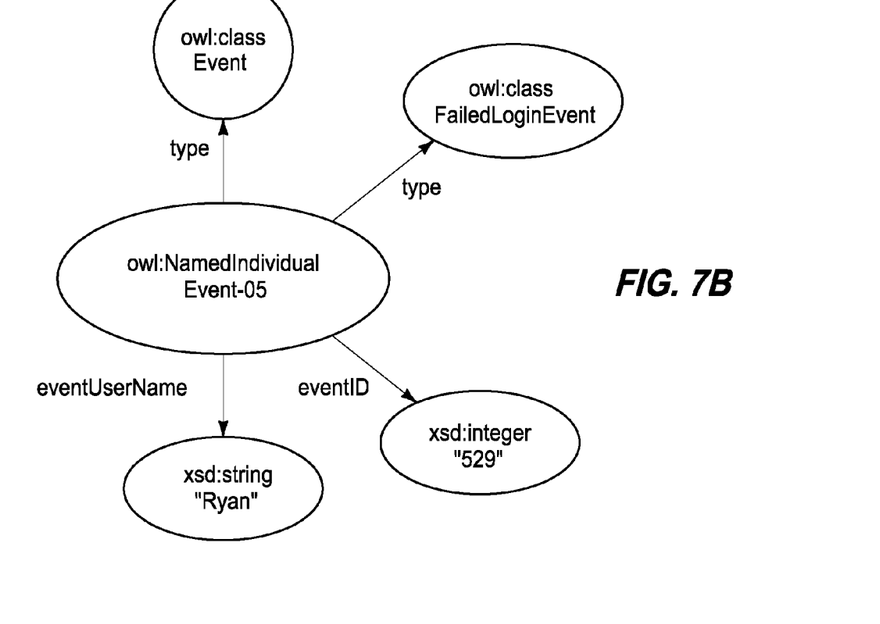

Referring to FIGS. 7A and 7B, example operations of a reasoning module which supports subsumption reasoning are discussed in one embodiment. Subsumption reasoning modules are configured to recognize when a class of an individual is subsumed by another class. More specifically, these reasoning modules operate, when a concept is a subclass of a more general class, to assert that the more specific concept is a subclass of the more general class. For example, a FailedLoginEvent is a subclass of the Event class, and any specific FailedLoginEvent has all the characteristics of an Event.

Referring to FIG. 7A, an abstraction including an individual owl:NamedIndivdivalEvent-05 present in working memory and having a plurality of data-type properties is shown. The depicted abstraction may be generated by a reifier as an event as a result of a user attempting to log onto a computer. A reasoning module which subscribes to individuals of class Event receives the abstraction including the individual from working memory.

The reasoning module accesses its respective rules defined by the domain ontology to reason over the abstraction. For example, the reasoning module may be configured to further classify individuals by identifying individuals which are failed login events where a user attempted to log into a computer but was unable to provide the correct password. One possible rule for the reasoning module is:

If (eventID==529) {assert (Event-05, FailedLoginEvent)}

In the example of FIG. 7A, the eventID is xsd:integer "529" and the reasoning module further classifies the individual by adding a new abstraction as shown in FIG. 7B including adding a data-type property owl:class FailedLoginEvent to the individual. The reasoning module then publishes the new abstraction into the working memory and internal episodic memory. Other reasoning modules which subscribe to failed login events (such as discussed below with respect to FIGS. 8A and 8B) may receive this published abstraction.

Figure 8A:
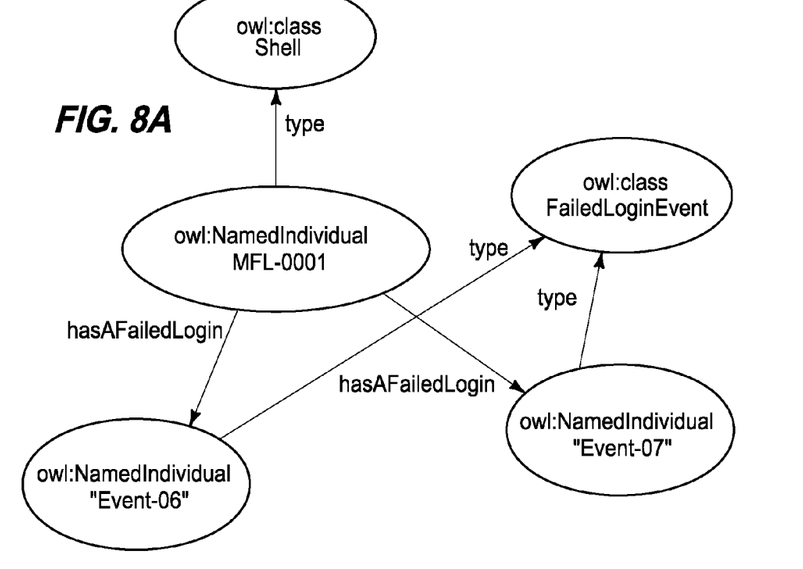
FIGS. 8a and 8b are semantic graphs depicting composition processing according to one embodiment.
Figure 8B:
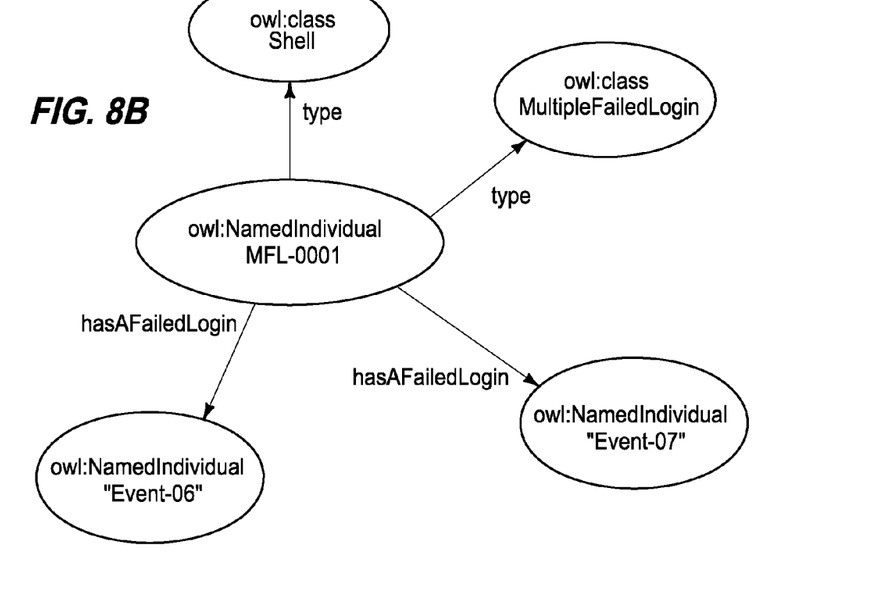

Referring to FIGS. 8A and 8B, example operations of a reasoning module which supports composite reasoning are discussed in one embodiment. Composite reasoning modules are configured to recognize or infer when the parts to a whole are present.

Referring again to the insider threat example, it may be beneficial to identify suspicious behavior in an organization. One example of suspicious behavior may be a plurality of repeated occurrences of failed attempts to log into a computer by a user within the organization, which may be indicative of a brute force method of trying to gain access to a computer. As discussed below, one of the reasoning modules may be configured to attempt to identify multiple failed login attempts of a specific computer.

Following the discussion above, the reasoning module of FIGS. 7A and 7B may publish an abstraction into the working memory which classifies an individual of the abstraction as a type FailedLoginEvent. The domain ontology in this described example provides a composite reasoning module which subscribes to abstractions of type FailedLoginEvent and attempts to determine whether multiple failed login attempts have occurred between a successful login attempt. Accordingly, working memory passes the abstraction to the composite reasoning module for further processing after an individual of the abstraction has been classified as a FailedLoginEvent and published to working memory.

In this described example, the rules for the composite reasoning module provide a definition of the class MultipleFailedLogin that is equivalent to the class of objects that: hasAfailedLogin min 2 FailedLoginEvent for a given user. Upon receipt of the abstraction, the composite reasoning module checks its state memory for the existence of a previously processed abstraction which may be related to the received abstraction (e.g., according to a binning property which may be the user in this example).

In one example, the abstractions may be classified according to binning properties defined in the ontology for the respective reasoning module. In the described example wherein the reasoning module is configured to identify or classify failed login abstractions as multiple failed logins, the abstractions may be binned according to the username of the person attempting to log into a computer. Accordingly, if an individual which has a data type username property from a user "Ryan" is received by the composite reasoning module, the reasoning component manager determines whether a reasoning component has already been created for the user "Ryan" as a result of the processing of a previous abstraction which included an individual associated with user "Ryan." In one embodiment, the reasoning component manager checks the state memory for the existence of a previously created reasoning component classified according to a binning property for user "Ryan."

In one example where a reasoning component has not previously been created for "Ryan," the reasoning component manager creates a new reasoning component for the new abstraction by binding a reasoner (e.g., a description logic reasoner such as a Pellet reasoner) to the abstraction and which processes the abstraction according to its rules defined by the ontology. If the rules are not satisfied (i.e., an insufficient number of FailedLoginEvents for user Ryan have occurred), the reasoning module retains the reasoning component with the binning property for user "Ryan" in its state memory for processing of future abstractions associated with user "Ryan" which may be received.

For example, if the composite reasoning module previously encountered a single FailedLoginEvent from a specific user, then the composite reasoning module previously created a reasoning component for the abstraction but failed to satisfy the rules to further classify the abstraction as a MultipleFailedLogin. The composite reasoning module retains the created reasoning component in its state memory. Thereafter, when another abstraction of a FailedLoginEvent is received for the same user, the composite reasoning module accesses the stored reasoning component and again applies its respective rules. If the rules are met (e.g., a sufficient number of FailedLoginEvents for user Ryan have occurred) then the reasoning module may create a new abstraction containing a newly created individual of class MultipleFailedLogin and publish and instantiate the new abstraction including the new individual in working memory as well as retain a copy of the new abstraction in its episodic memory.

Referring to FIG. 8A, an individual owl:NamedIndivdival MFL-0001 of class shell is depicted. Previously, the reasoning module created a reasoning component upon receipt of an abstraction identified as "Event-06" corresponding to a FailedLoginEvent of user Ryan. However, the rules were not met (e.g., an insufficient number of FailedLoginEvents from user Ryan were received as defined by the rules) and the reasoning component was retained in the state memory of the reasoning component. Thereafter, if a newly received abstraction of a FailedLoginEvent of user Ryan is received at a subsequent moment in time, the newly received abstraction (i.e., "Event-07") is added to the reasoning component. Thereafter, it is determined whether the rules for the reasoning component are satisfied. In this example, two FailedLoginEvents from a common user have been received and the rule has been satisfied. Since the rule is satisfied, the reasoning module creates a new individual shown in FIG. 8B of class MultipleFailedLogin and publishes the abstraction including the newly created individual into working memory as well as retains the new abstraction in episodic memory.

Accordingly, in one embodiment, some processing of the reasoning modules may result in further classification of individuals as well as creation of new individuals of a new class. For example, in subsumption processing, a reasoning module may assert a new data typing property for an individual of an abstraction (e.g., a SecurityEvent is a FailedLoginEvent), and in composite processing, a reasoning module may create a new individual of a new class as a result of processing of abstractions including individuals of a different class. In the example of FIG. 8B, the reasoning module has added a new object type property and individual of the class MultipleFailedLogin to the existing abstraction in addition to two pre-existing individuals of the class FailedLogin which resulted in the creation and instantiation of the new individual of the class MultipleFaieldLogin into the semantic graph of the abstraction.

The semantic graph of the working memory grows over time during processing of incoming data. For example, incoming raw data may be processed and reifiers may instantiate new individuals of the data into the semantic graph. Furthermore, as discussed above, the processing by the reasoning system may create new individuals as well as add new data-type and object-type properties to the existing semantic graph. The semantic graph of the working memory may be interacted with by users, for example, by querying the semantic graph using an appropriate editor, such as Protégé.

According to one embodiment, the information processing system 10 takes in data with no semantic tagging and the domain knowledge expressed in the respective domain ontology provides data typing (semantic layer) which allows for the semantic tagging of the primitive data types being input into the system via a reification process. Once the "literal" facts are in the semantic graph of the working memory following the reifying process, the reasoning modules begin the process of further abstraction and classification. New higher level facts are added to the semantic graph when the salient facts are present. The individual reasoning modules of the reasoning system execute this process on small subgraphs of the larger semantic graph which is stored in working memory in the described example embodiment (e.g., the sub-graphs being reasoned over by the respective reasoning modules are defined by the typing rules which specify the abstractions of the larger semantic graph of the working memory which are subscribed to by the respective reasoning modules).

One embodiment of the reasoning system of the information processing system provides a plurality of different domain ontologies which are tailored to process data from different subject matter domains. The system is flexible to accommodate diverse domains of subject matter based upon different implementations and also enables reasoning over data in different and diverse domains and which data of different and diverse domains may be combined to infer additional knowledge.

Also, the separation of domain knowledge from a reasoning framework according to one embodiment enables the information processing system to be easily and efficiently adapted to different reasoning applications. For example, the framework's source code does not need to be changed and recompiled whenever the domain knowledge is updated or changed as contrasted with implementations which hard-code the domain knowledge within the reasoning framework. Furthermore, the separation of domain knowledge from the reasoning framework in one embodiment of the information processing system provides a domain agnostic quality which enables the system to be applied to diverse problems without modification to the reasoning framework.

In compliance with the statute, the invention has been described in language more or less specific as to structural and methodical features. It is to be understood, however, that the invention is not limited to the specific features shown and described, since the means herein disclosed comprise preferred forms of putting the invention into effect. The invention is, therefore, claimed in any of its forms or modifications within the proper scope of the appended claims appropriately interpreted in accordance with the doctrine of equivalents.

Further, aspects herein have been presented for guidance in construction and/or operation of illustrative embodiments of the disclosure. Applicant(s) hereof consider these described illustrative embodiments to also include, disclose and describe further inventive aspects in addition to those explicitly disclosed. For example, the additional inventive aspects may include less, more and/or alternative features than those described in the illustrative embodiments. In more specific examples, Applicants consider the disclosure to include, disclose and describe methods which include less, more and/or alternative steps than those methods explicitly disclosed as well as apparatus which includes less, more and/or alternative structure than the explicitly disclosed structure.

What is claimed is:

1. An information processing system comprising:
   a working memory comprising a semantic graph which comprises a plurality of abstractions, wherein the abstractions individually include an individual which is defined according to an ontology; and
   a reasoning system comprising a plurality of reasoning modules which are configured to process different ones of the abstractions of the semantic graph, wherein a first of the reasoning modules is configured to process a plurality of abstractions which include individuals of a first classification type of the ontology and a second of the reasoning modules is configured to process a plurality of abstractions which include individuals of a second classification type of the ontology, wherein the first and second classification types are different.

2. The system of claim 1 further comprising a plurality of reifiers configured to assert the plurality of abstractions including the individuals of the first and second classification types into the semantic graph.

3. The system of claim 1 wherein the reasoning system comprises a plurality of different regions which individually include a plurality of the reasoning modules, wherein the reasoning modules of the different regions are configured to process a plurality of the abstractions according to different rules defined by a plurality of different domain ontologies which correspond to respective ones of the regions.

4. The system of claim 3 wherein the reasoning modules of one of the regions are configured to process a plurality of the abstractions which were previously processed by the reasoning modules of another of the regions.

5. A reasoning module comprising:
   an interface coupled with a working memory and configured to receive a plurality of abstractions from the working memory, wherein the abstractions include a plurality of individuals; and
   a reasoning component configured to access the abstractions which are received by the interface, to access a plurality of rules for the reasoning module, to process the abstractions according to the rules, and to further classify the individual of one of the abstractions as a result of the processing of the one of the abstractions satisfying the rules of the reasoning module.

6. The module of claim 5 wherein the reasoning component comprises a reasoner which is configured to access the rules and to process the abstractions in accordance with the rules.

7. The module of claim 5 wherein the reasoning component is configured to implement subsumption processing of the abstractions.

8. The module of claim 5 wherein the reasoning component is configured to further classify the individual of the one of the abstractions by adding a new data type property to the one of the abstractions.

9. A reasoning system design method comprising:
   providing a domain ontology of a given subject matter domain to be processed; and using the domain ontology, designing a reasoning system which is configured to process information of the given subject matter domain including defining, for a plurality of reasoning modules of the reasoning system, which abstractions of a semantic graph are to be subscribed to by respective ones of the reasoning modules and a plurality of rules which the reasoning modules are to utilize to process respective ones of the abstractions which are subscribed to by respective ones of the reasoning modules.

10. The method of claim 9 wherein the defining the rules comprises defining the rules which the reasoning modules utilize to process the respective abstractions including adding new properties to the respective abstractions.

11. The method of claim 9 wherein the defining the rules comprises defining the rules which the reasoning modules utilize to process the respective abstractions which include individuals of a first classification type including creating new individuals of a second classification type.

12. The method of claim 9 wherein the defining, for one of the reasoning modules, comprises defining that the one of the reasoning modules only processes the abstractions which have been previously processed by another of the reasoning modules.

13. The method of claim 9 wherein the defining comprises defining that different ones of the reasoning modules subscribe to different ones of the abstractions according to classifications of individuals of the abstractions.

14. The method of claim 9 wherein the ontology is encoded in a formalized knowledge representation programming language and the reasoning modules are specified in an object oriented programming language.

15. The method of claim 9 further comprising providing another domain ontology of another subject matter domain to be processed, and wherein the designing comprises using the another domain ontology to define, for a plurality of additional reasoning modules of the reasoning system, which abstractions of the semantic graph are to be subscribed to by respective ones of the additional reasoning modules and a plurality of rules which the additional reasoning modules are to utilize to process the respective abstractions which are subscribed to by respective ones of the additional reasoning modules.

* * * * *